June 11, 1940. L. H. MORIN ET AL 2,203,694
SEPARABLE FASTENER ELEMENT AND THE METHOD OF MAKING THE SAME
Filed Feb. 15, 1937 2 Sheets-Sheet 1
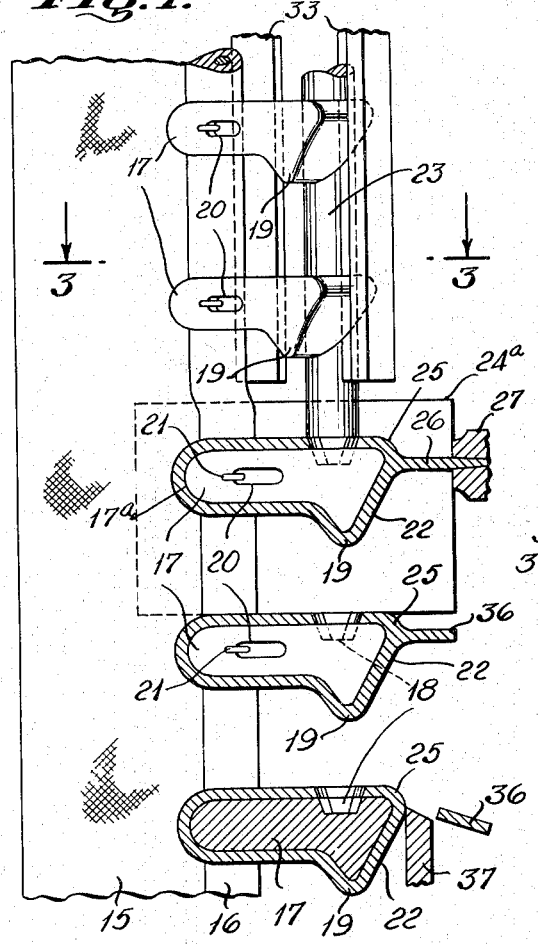
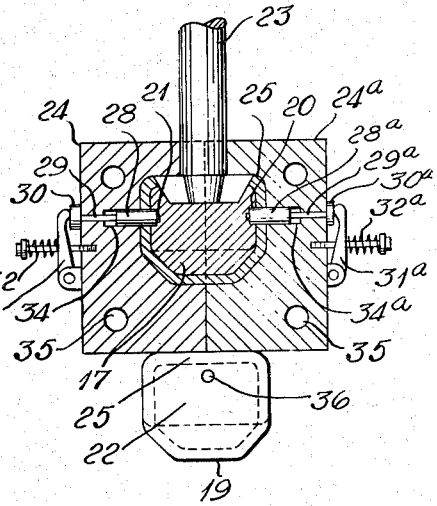
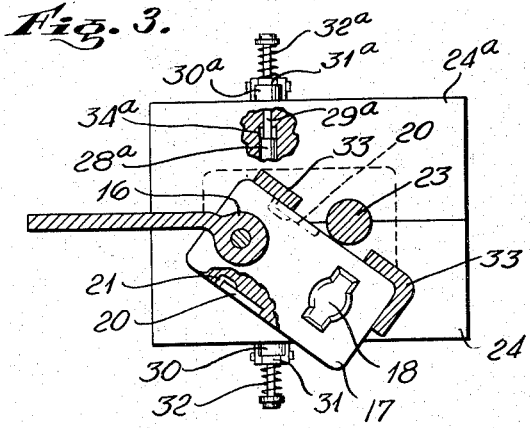
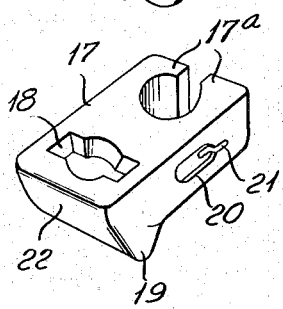
INVENTOR
LOUIS H. MORIN
DAVIS MARINSKY
BY
ATTORNEY

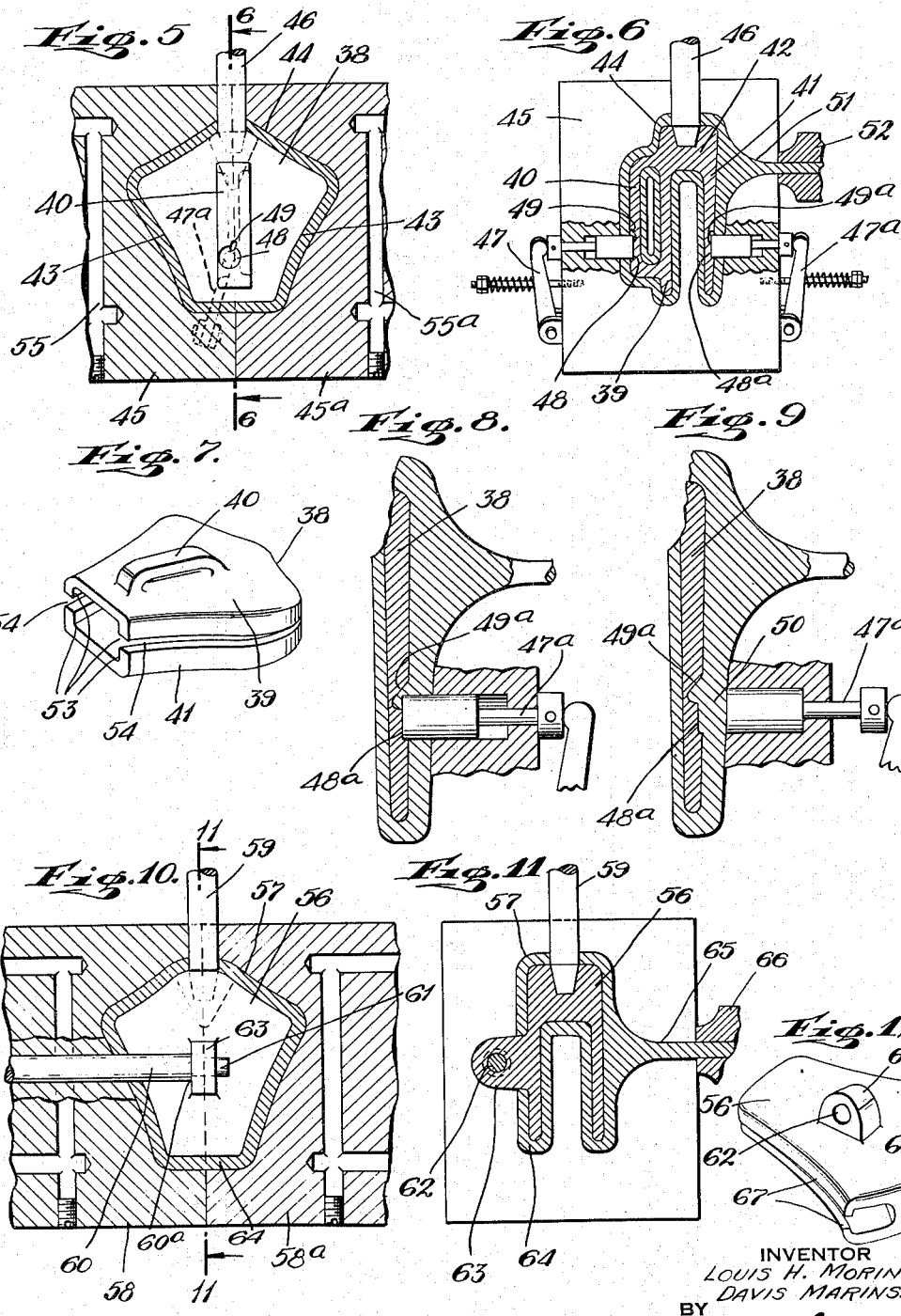

Patented June 11, 1940

2,203,694

UNITED STATES PATENT OFFICE 2,203,694

SEPARABLE FASTENER ELEMENT AND THE METHOD OF MAKING THE SAME

Louis H. Morin and Davis Marinsky, Bronx, N. Y., assignors to Whitehall Patents Corporation, New York, N. Y., a corporation of New York Application February 15, 1937, Serial No. 125,820

4 Claims. (Cl. 24—205)

This invention relates to the manufacture of links or scoops of separable fastener stringers as well as the sliders and other parts of devices of this kind; and the object of the invention is to provide devices of the kind and class referred to formed from an insert or reinforcement enveloped or substantially enveloped in a body of non-metallic material forming a coating or jacket therefor to give to the device distinct and varied color values and to form a protection for the insert, especially when composed of metal; a further object being to provide a device of the class described wherein the coating is applied in accordance with a casting or molding process more fully hereinafter set forth; a further object being to provide a device wherein the enveloping casing or jacket is composed of a body of plastic or thermoplastic material and wherein cellulose acetate is preferably used due to the strength and other advantageous characteristics of this material and the fact that it may be produced in many colors; a further object being to provide a method which consists in first attaching an insert or reinforcing member to a supporting strip or strand and then enveloping said insert in an outer shell or jacket; a still further object being to provide a novel method of supporting an insert in a casting or molding die in the process of casting an enveloping casing or jacket on the insert to insure proper and even distribution of the material employed in the jacket around said insert, which method is applicable to the die casting or molding of any kind or class of device including a reinforcement insert; and with these and other objects in view, the invention consists in a device of the class described and the method as more fully hereinafter specifically described and claimed.

The invention is fully disclosed in the following specification, of which the accompanying drawings form a part, in which the separate parts of the improvement are designated by suitable reference characters in each of the views, and in which:

Fig. 1 is a diagrammatic side and sectional view of a part of a separable fastener stringer indicating the method of forming the links thereon.

Fig. 2 is a diagrammatic transverse sectional view through the die shown in Fig. 1, illustrating the method of supporting the insert in the impression of the die in the operation of casting therearound.

Fig. 3 is a sectional view on the line 3—3 of Fig. 1.

Fig. 4 is a perspective view of one of the link inserts detached.

Fig. 5 is a sectional plan view diagrammatically illustrating another form of die employed for casting the slider.

Fig. 6 is a section substantially on the line 6—6 of Fig. 5.

Fig. 7 is a perspective view of the finished slider, detached, formed from the dies shown in Figs. 5 and 6.

Fig. 8 is an enlarged sectional detail view of a part of the modification shown in Fig. 6.

Fig. 9 is a view similar to Fig. 8 showing parts in a different position at the completion of a casting operation.

Fig. 10 is a view similar to Fig. 5 diagrammatically illustrating the method of forming another form of slider.

Fig. 11 is a section substantially on the line 11—11 of Fig. 10; and,

Fig. 12 is a perspective view showing a slider made from the dies shown in Figs. 10 and 11.

Heretofore, in the construction of the various parts of separable fasteners such as the links or scoops, sliders, end stops, pulls and the like, these parts have been either formed from sheet metal stampings or of unitary cast or molded bodies. It is the object of the present invention to form parts of the kind under consideration from an inner core piece or insert composed of one material around which is formed by molding, die-casting or otherwise, an enveloping casing or jacket which envelops all or substantially all of the insert, either for the purpose of applying a hard shell or outer surface to a softer inner insert part or in providing a more rigid, sturdy reinforcing member as an insert within a plastic outer casing or jacket especially in enveloping a metallic part in a casing or jacket of cellulose acetate or similar thermoplastic material, and still more particularly in molding or die casting such material around the insert in the formation of separable fastener devices of the kind under consideration.

Another distinctive feature of the present invention resides in a novel method of supporting and backing an insert within the impression chamber of a die so as to maintain the insert in proper position within the impression in resisting the pressure of the casting material injected into the impression and during the casting operation to automatically relieve said supporting and backing means to provide a complete or substantially complete envelopment of the insert within the body of cast material. While in the present illustrations, this result is accomplished in conjunction with a core which is utilized as a means of ejecting and feeding the cast body from the impressions of the die, in many instances, the use of such a core is not essential.

A still further distinctive feature of the invention resides in the process which consists in applying one part or element to a supporting tape or strand and arranging a number of said parts at spaced intervals thereon and then casting or otherwise applying the outer coating, casing or jacket to said parts, for example, in first applying a number of metallic links to the stringer tape of a fastener stringer and then applying the cellulose acetate jacket to the metallic links in a successive series of casting operations.

In Figs. 1 to 4 inclusive, the invention is shown as applied to the manufacture of the stringer tapes of separable fasteners, and in these figures, 15 represents a part of a stringer tape having a beaded edge 16 to which is attached at equally spaced intervals a plurality of scoops or links 17. The links 17 may be formed in any desired manner to provide beyond the beaded edge the coupling end portions having sockets 18 at one side and the projecting members 19 at the other side for engaging sockets of opposed stringer links. In the construction shown, the links 17 are in the form of die castings. In forming these links, opposed side surfaces are provided with elliptical or other recesses 20 having relief grooves 21 at one end thereof opening through the outer surfaces of the link and the inner surface of the groove 20 as clearly seen in Figs. 3 and 4 of the drawings.

In the drawings, we have diagrammatically illustrated a process of molding or die casting a coating, casing or jacket 22 of plastic material around the link 17 to completely cover all exposed surfaces thereof with the exception of the sockets or recesses 18 in which the core and ejector pin 23 is supported during casting operation. This pin is disposed between adjacent surfaces of die parts 24, 24a within and between which is formed an impression 25 sufficiently great in size and contour so as to form a clearance space between the link 17 which forms an insert piece on the walls of the impression to provide on the insert at the completion of a casting operation a coating, casing or jacket of predetermined or desired thickness throughout.

In the construction shown, the thickness is illustrated as being substantially even on all surfaces, but it will be apparent, however, that in some instances the thicknesses may vary to supply an added amount or a decreased amount of the coating material to suit the use to which the device is intended. On the parting line of the dies and between adjacent surfaces thereof is formed an opening or passage 26 forming a gate of communication between the impression 25 and the ejection nozzle 27 adapted to be moved into position to register with the passage 26 in the intermittent casting operations to be performed. In using cellulose acetate as a casting material around the insert link 17 in forming the jacket 22, it is desirable to provide means for backing up and supporting the insert against movement within the impression 25 so as to resist the excessive pressures required to introduce the casting material into the impression. For this purpose, two supporting or backing pins or members 28, 28a are arranged in each of the die parts 24, 24a, and the inner ends thereof are adapted to seat in the recesses 20 of the links or inserts 17. The outer ends of the pins 28, 28a are reduced as seen at 29, 29a and provided outwardly of the dies with blocks 30, 30a in connection with which the free ends of pivot arms 31, 31a operate, said arms having adjustable tensional means 32, 32a to regulate the tension of the arms 31, 31a upon the pins or to hold said pins seated in the recesses 20.

In the operation of carrying out the process diagrammatically illustrated in Figs. 1 to 3 inclusive, a stringer 15 with the links or elements 17 spaced thereon is arranged in position to move between adjacent surfaces of the die parts 24, 24a or between the parting line thereof, and suitable means such as indicated at 33 in Fig. 3 of the drawings is provided for normally supporting the element 17 in the angular position shown in said figure in order to clear the core pin 23. The stringer is then arranged in position to dispose one end link or element 17 in position between the parting line of the dies and below the means 33. The pin 23 is then moved downwardly and the dies brought together, and at the same time, the pins 28, 28a are moved into the recesses 20 of the element 17 and said element is then supported within the impression 25 of the die. When the die parts are in firm engagement with each other and held so under pressure, the casting material is forced into the impression forming the casting 22 around the element 17 as before described. In this operation, the pressure of the casting material extending into the relief grooves 21 to the bottom wall of the recesses 20 and beyond the inner surfaces of the pins 28, 28a will operate to automatically force the pins 28, 28a outwardly against the adjustable tensional means 32, 32a until these pins strike the stop shoulders 34, 34a, in which position, the inner surfaces of the pins will be in substantial alinement with the boundary walls of the impression 25 and the resulting casting will thus have smooth or relatively smooth and continuous outer surfaces, the definition of which will be defined by the last named position of said pins 28, 28a. In other words, no recesses will appear where the recesses 20 were provided in the element 17. Water or another cooling agent will be circulated through passages 35 formed in the die parts to aid in chilling the casting.

At the completion of the casting operation, the die parts 24, 24a are separated sufficiently to free the casting from the impression in each die part, but before completely separating the die parts, the pin 23 is raised to remove the same from the casting and out of engagement with the next link or element 17. Then, suitable means, not shown, is provided for feeding the tape 15 downwardly to bring said next link in position to enter the impression of the dies and the above operation is repeated.

As the castings are formed and removed from the dies or at any desired point therebeyond, the projecting gates 36 of the casting may be trimmed off by a suitable knife or other trimming tool 37 as indicated at the lower part of Fig. 1 of the drawings. Any other trimming or finishing operations that may be necessary can be performed. In some instances, it may be desirable to chill the links or elements immediately prior to insertion into the impressions of the die in order to increase the setting or hardening operation of casting or molding materials employed, whereas, in other cases, the normal temperature of the link or element will be sufficient and desirable in performing the desired casting operation thereon.

In the above described casting operation, in initially injecting the casting material into the impression 25, a relatively low pressure may be employed, and this pressure increased during the final stages and especially the stage wherein the pins 28, 28a are forced outwardly. The pressure of the casting material which is of a nature to remain plastic for an appreciable period of time permit this plastic material to exert hydraulic pressure against the inner surface of said pins in forcing the same outwardly. In this connection, it will be understood that normally such actions might not take place with casting materials which chill or set quickly. However, any material or compound capable of acting in the manner described above, for example in the manner in which cellulose acetate acts, may be used.

In Figs. 5 to 9 inclusive, the same method specifically described above is shown as applied to the formation of what are known as sliders 38 employed on separable fastener stringers, and particularly, sliders having on one side wall 39 thereof an elongated loop 40 for the attachment of a finger piece or pull thereto. The other wall 41 of the slider joins the wall 39 in a V-shaped web 42 indicated in Fig. 6 of the drawings as in other devices of this kind. In this construction, a slider blank is first formed from a die cast body and the side edges 43 of this blank are straight or unbent. This blank forms the insert to be disposed within an impression 44 formed between adjacent die parts 45, 45a and supported upon a pin 46 arranged on the parting line of the die parts and also by resiliently controlled backing and relief pin units 47 and 47a similar in all respects to the units consists of the pins 28, 28a and the parts associated therewith, as specifically described in connection with Figs. 1 to 3 inclusive. For this reason, further detailed description of these units is unnecessary in Fig. 6.

The units 47, 47a are arranged substantially on the parting line, sufficiently off-centre, however, to retain the pins against displacement from the die parts. However, suitable means may be provided for supporting the pins on the parting line, it being understood that the spring actuated arms may be offset or angularly disposed. These units may also be mounted as disclosed in Fig. 2, where the pins 28, 28a are at right angles to the parting line, or, in fact, may be arranged in any desired position, depending entirely upon the contour of the insert and the desired location of the supports with respect to the material introduced into the impression.

The top wall of the part 40 and the outer surface of the bottom wall 41 of the slider are recessed as seen at 48, 48a to receive the pin parts of the units 47, 47a. These recesses also have the by-pass grooves 49, 49a as clearly represented in Figs. 8 and 9 of the drawings, in which figures, the movement and operation of the units 47, 47a are clearly illustrated on an enlarged scale. The position of the unit 47a in Fig. 8 is just prior to the applied pressure, and in Fig. 9 shows the result of the applied pressure and the finished wall of the cast body 50 completely covering the recessed part 48a of the insert 38. The illustration in Figs. 8 and 9 is applicable to the structure shown in Figs. 1 to 3 inclusive to clearly illustrate the backing and relief pins.

Between the parting line of the dies 45, 45a is an admission opening or gate 51 so that the plastic material forming the casing or jacket enveloping the insert 38 may be injected into the impression 44 from an injector nozzle 52. The gate formed by the passage 51 may be trimmed off in any desired manner after the device has been formed.

With the construction shown in Figs. 5 and 6, after the pins have moved into the position shown in Fig. 9, the die parts 45, 45a are separated and the core pin 46 is used to eject the casting from the impression 44 in this operation and also to feed the casting out of registering position with the impression and this casting may be stripped from the core 46 and another insert 38 applied thereto and the above casting operation may be repeated.

After the casting has been formed in the manner above stated, the side edges 43 of the slider are still straight or flat. The next operation in finishing the slider, aside from any trimming operations which may be necessary will consist in bending the side edges inwardly to form inturned flanges 53 at opposite sides of the finished slider as shown in Fig. 7 of the drawings and between which are the usual passages 54 for receiving the tape of the stringer, such for example, as the tape 15. The die parts 45 and 46 will have cooling passages 55, 55a as in other devices of this kind through which a cooling agent may be circulated to aid in setting and hardening the casting material employed.

In Figs. 10, 11 and 12 of the drawings, another form of slider 56 is shown as well as another method of supporting the insert piece in the impression 57 between the die parts 58, 58a. With this method, in addition to the core and ejector pin 59, a supplemental core and supporting pin 60 is employed and substituted for the pin units 47 and 47a. With this construction, the pin 60 or reduced end 61 thereof is arranged in the aperture 62 of an upwardly projecting lug 63 on the top wall of the slider 56.

With this construction, the impression 57 is so formed as to not extend onto the lug 66 so that after the cast body 64 has been formed on the core, the outer surfaces of the lug 63 are not covered or coated with said material. In other words, the pin 60 is disposed in the die part 58 at one side of the impression 57. With this method, after the casting 64 has been formed by introducing the material through the gate 65 from the nozzle 66, the die parts 58, 58a are separated and the pin 60 withdrawn. The core 59 is here also used to eject the casting from the impression 57 and when the casting has been removed from the dies, the same is stripped from the core and the next casting operation is performed. With this construction, the location of the pin 60 in conjunction with the core 59 will centralize the slider core within the impression 56 with respect to the top and bottom walls, whereas the shoulder 60a on the pin engaging the lug 63 will support the slider, in conjunction with the core 59, in proper position in the other direction in the impression 57 as clearly illustrated in Fig. 10 of the drawings.

After the casting has been formed from the dies in the manner illustrated in Figs. 10 and 11, the edges of the side walls are turned inwardly as indicated at 67 in Fig. 12 of the drawings, as with the construction shown in Fig. 7, and the trimming and other finishing operations are performed thereon.

While the invention has been shown as applied to the making of separable fastener links and sliders employed for coupling and uncoupling the links, the invention is also applicable to the making of other separable fastener parts including end stops and the like. It will also be understood in this connection that the method herein disclosed for supporting and backing inserts within the impression chamber of dies in forming a die cast jacket or casing around the insert, and in relieving such supporting and backing pins by the pressure of the casting material is applicable to the formation of devices of any kind or class, and especially where it is desirable to apply the cast material to the entire exterior surface of the insert employed.

Upon a consideration of Figs. 1 and 4, especially, it will be seen that the pins 28, 28a employed are of elliptical form to fit into correspondingly formed recesses. While the pins of the units 47, 47a are shown as being round, elliptical pins may here also be employed. The purpose of the elliptical formation is simply to provide support for the insert against twisting movement, or any other irregular contour may be provided which would accomplish this same result. This contour in the pins is important, especially where a core pin is not employed and where the centering lining and relief pins such as 28, 28a alone would be employed.

In some forms of our invention and in the manufacture of certain cast parts, the inserts may be arranged in spaced relation to each other within a complete casting. These different forms and applications of our invention are not specifically shown and described in detail, as they are quite apparent from the disclosure in the several forms of construction herein disclosed.

In connection with the formation of stringers with the coupling links or scoops thereon, it is not essential that the insert be first attached to the tape or stringer, as in some cases, it may be practical and desirable to form the links independently of the tape with the inserts contained within the coating or jacket of cellulose acetate or other material, in which event, the forked ends 17a of resulting links as seen in Fig. 4 of the drawings will be normally separated to permit mounting of the beaded edge 16, and then crimped or pinched thereon in the well known manner of attaching preformed metallic links to stringer tapes.

The cast material, such for example as cellulose acetate when employed will be heated and injected through the respective nozzles in accordance with the general teachings disclosed in our prior application, Serial Number 746,771, filed October 4, 1934, of which this application constitutes a continuation in part.

The invention herein disclosed not only includes the novel method of forming die cast devices from thermoplastic or similar die casting material upon an insert but also in the novel structural arrangement of dies, and particularly, in the use of the pins 28, 28a and the corresponding units 47, 47a which may well be termed supplemental die parts which are yieldably supported in the dies and which when moved outwardly by the pressure of the casting material into the position such as illustrated in Fig. 9 of the drawings complete the formation of the impression in the die, or in other words, form part of the outer wall structure of the impression.

Where core pins are used, as indicated in Figs. 5, 6, 10 and 11, the apertures or recesses left by these core pins may, if desired, be filled or partially filled with some of the casting material.

Having fully described our invention, what we claim as new and desire to secure by Letters Patent is:

1. In separable fasteners employing coupling links spaced longitudinally of a mounting member, each link comprising a forked mounting end portion arranged on the mounting member and a coupling end portion projecting beyond one edge of the mounting member, said link comprising a die cast thermoplastic body, a metallic body arranged within and substantially completely enveloped by said thermoplastic body, the metallic body forming means to securely retain the thermoplastic body on said mounting member, and said metallic body closely conforming to the external contour of said link throughout said mounting and coupling end portions thereof.

2. In a device of the character described, an elongated fabric mounting member, a plurality of die cast metallic bodies fixedly secured to the mounting member at longitudinally spaced intervals thereon, an outer die cast thermoplastic body on each of said metallic bodies, the thermoplastic body forming a shell of predetermined thickness substantially completely enveloping the metal body and closely conforming to the contour of said metal body, and said metal body forming means securely retaining the thermoplastic bodies against displacement from or movement longitudinally of said mounting member.

3. In separable fastener devices, a die cast thermoplastic fastener part having a predetermined surface contour, a die cast metallic insert arranged within said part and closely conforming in contour to the contour of the external surface of said thermoplastic part throughout substantially the entire extent of said surface, said metallic insert having detents on predetermined surfaces thereof, and the thermoplastic body having integral portions extending into the detents of the metallic insert.

4. In separable fastener devices, a die cast thermoplastic fastener part having a predetermined surface contour, a die cast metallic insert arranged within said part and closely conforming in contour to the contour of the external surface of said thermoplastic part throughout substantially the entire extent of said surface, said metallic insert having detents on predetermined surfaces thereof, the thermoplastic body having integral portions extending into the detents of the metallic insert, and a portion of the die cast insert being exposed through one surface of said thermoplastic body.

LOUIS H. MORIN.
DAVIS MARINSKY.